United States Patent
Lim et al.

(10) Patent No.: US 9,301,329 B2
(45) Date of Patent: Mar. 29, 2016

(54) APPARATUS, A METHOD AND A COMPUTER PROGRAM FOR INTERCONNECTING MULTIPLE COMPUTER NETWORKS

(75) Inventors: Hock Beng Lim, Singapore (SG); Mudasser Iqbal, Singapore (SG); Daiqin Yang, Singapore (SG); Talha Obaid, Singapore (SG); Teng Jie Ng, Singapore (SG)

(73) Assignees: Nanyang Technological University, Singapore (SG); Singapore Technologies Dynamics Pte Ltd, Singapore (SG)

( * ) Notice: Subject to any disclaimer, the term of this patent is extended or adjusted under 35 U.S.C. 154(b) by 263 days.

(21) Appl. No.: 14/006,600

(22) PCT Filed: Dec. 30, 2011

(86) PCT No.: PCT/SG2011/000459
§ 371 (c)(1),
(2), (4) Date: Dec. 30, 2013

(87) PCT Pub. No.: WO2012/128716
PCT Pub. Date: Sep. 27, 2012

(65) Prior Publication Data
US 2014/0122650 A1    May 1, 2014

Related U.S. Application Data

(60) Provisional application No. 61/454,863, filed on Mar. 21, 2011.

(51) Int. Cl.
*H04W 76/02* (2009.01)
*H04W 92/02* (2009.01)
*H04W 8/26* (2009.01)
*H04W 40/24* (2009.01)

(52) U.S. Cl.
CPC ............ *H04W 76/025* (2013.01); *H04W 92/02* (2013.01); *H04W 8/26* (2013.01); *H04W 40/24* (2013.01)

(58) Field of Classification Search
CPC ... H04W 76/025; H04W 4/001; H04W 88/00; H04W 92/02; A61B 5/0024; A61B 5/117; A61B 5/002; H04L 45/00; H04L 67/28
See application file for complete search history.

(56) References Cited

U.S. PATENT DOCUMENTS

| | | | |
|---|---|---|---|
| 2005/0226206 A1* | 10/2005 | An | 370/349 |
| 2010/0177660 A1 | 7/2010 | Essinger et al. | |
| 2010/0315225 A1* | 12/2010 | Teague | 340/539.12 |

* cited by examiner

*Primary Examiner* — Kim T Nguyen
(74) *Attorney, Agent, or Firm* — Seed IP Law Group PLLC (57) ABSTRACT

An apparatus for interconnecting multiple computer networks, each computer network using a different protocol suite and comprising multiple nodes, the apparatus being a node of each computer network, the apparatus comprising: a transceiver configured to receive data from any node of any one of the multiple computer networks, the received data being for transmission to a node of a different one of the multiple computer networks; and a processor configured to identify the node of the different one of the multiple computer networks based on the received data, to determine a protocol suite of the different one of the multiple computer networks using the memory, to process the received data so that the received data appears to have been transmitted according to the determined protocol suite, and to cause the transceiver to transmit the processed received data to the node of the different one of the multiple computer networks.

31 Claims, 6 Drawing Sheets

| Index of WPAN | Protocol suite | PAN ID | MAC addr of PAN coordinator |
|---|---|---|---|
| | | | |
| | | | |

(a)

| MAC addr | OW | next-hop in OW | addr in W 1 | addr in W 2 | ...... | addr in W n |
|---|---|---|---|---|---|---|
| | | | | | | |
| | | | | | | |

APPARATUS, A METHOD AND A COMPUTER PROGRAM FOR INTERCONNECTING MULTIPLE COMPUTER NETWORKS

CROSS-REFERENCE TO RELATED APPLICATION

This application claims priority from U.S. provisional patent application No. 61/454,863, filed 21 Mar. 2011, the content of it being hereby incorporated by reference in its entirety for all purposes.

TECHNICAL FIELD

Various embodiments relate to an apparatus, a method and a computer program. In various embodiments, the method, apparatus and computer program are for interconnecting multiple computer networks.

BACKGROUND

A personal area network (PAN) is a computer network used for communication among computing devices, such as, for example, telephones and personal digital assistants, in proximity to one another. For example, the computing devices may be on or close to a person's body. The reach of a PAN may be only a few meters. PANs may be wired with a computer bus, such as, for example, a universal serial bus (USB) or a FireWire bus. A wireless personal area network (WPAN) can also be made possible with wireless network technologies, such as, for example, IrDA, Bluetooth, Wireless USB, Z-Wave, 6LoWPAN and ZigBee.

WPANs can use the same radio interface with different protocol suites. For example, the following different protocol suites may use the same wireless radio: Zigbee, 6LoWPAN, WirelessHART, and other IEEE 802.15.4 based WPANs. It is also possible that the radios of WPANs are different. For example, one WPAN could be Bluetooth-based while another WPAN could be UWB-based.

SUMMARY

Various embodiments provide, an apparatus for interconnecting multiple computer networks, each computer network using a different protocol suite and comprising multiple nodes, the apparatus being a node of each computer network, the apparatus comprising: a transceiver configured to receive data from any node of any one of the multiple computer networks, the received data being for transmission to a node of a different one of the multiple computer networks; a memory configured to store information relating to the multiple computer networks; and a processor configured to identify the node of the different one of the multiple computer networks based on the received data, to determine a protocol suite of the different one of the multiple computer networks using the memory, to process the received data so that the received data appears to have been transmitted according to the determined protocol suite, and to cause the transceiver to transmit the processed received data to the node of the different one of the multiple computer networks.

Various embodiments provide a method for interconnecting multiple computer networks, each computer network using a different protocol suite and comprising multiple nodes, the method comprising: joining each of the multiple computer networks to become a node of each of the multiple computer networks; receiving data from any node of any one of the multiple computer networks, the received data being for transmission to a node of a different one of the multiple computer networks; identifying the node of the different one of the multiple computer networks based on the received data; determining a protocol suite used by the different one of the multiple computer networks; processing the received data so that the received data appears to have been transmitted according to the determined protocol suite; and transmitting the processed received data to the node of the different one of the multiple computer networks.

Various embodiments provide a computer program product for interconnecting multiple computer networks, each computer network using a different protocol suite and comprising multiple nodes, the computer program product comprising at least one computer-readable storage medium having computer-executable program code instructions stored therein, the computer-executable program code instructions comprising: program code for joining each of the multiple computer networks to become a node of each of the multiple computer networks; program code for receiving data from any node of any one of the multiple computer networks, the received data being for transmission to a node of a different one of the multiple computer networks; program code for identifying the node of the different one of the multiple computer networks based on the received data; program code for determining a protocol suite used by the different one of the multiple computer networks; program code for processing the received data so that the received data appears to have been transmitted according to the determined protocol suite; and program code for transmitting the processed received data to the node of the different one of the multiple computer networks.

BRIEF DESCRIPTION OF THE DRAWINGS

In the drawings, like reference characters generally refer to like parts throughout the different views. The drawings are not necessarily to scale, emphasis instead generally being placed upon illustrating the principles of some example embodiments of the invention. In the following description, various example embodiments of the invention are described with reference to the following drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Various embodiments provide, an apparatus for interconnecting multiple computer networks, each computer network using a different protocol suite and comprising multiple nodes, the apparatus being a node of each computer network, the apparatus comprising: a transceiver configured to receive data from any node of any one of the multiple computer networks, the received data being for transmission to a node of a different one of the multiple computer networks; a memory configured to store information relating to the multiple computer networks; and a processor configured to identify the node of the different one of the multiple computer networks based on the received data, to determine a protocol suite of the different one of the multiple computer networks using the memory, to process the received data so that the received data appears to have been transmitted according to the determined protocol suite, and to cause the transceiver to transmit the processed received data to the node of the different one of the multiple computer networks.

In an embodiment, the processor is configured, with the transceiver, to transmit a request to the node of the said one of the multiple computer networks, the request instructing the node to transmit data to the apparatus.

In an embodiment, the transceiver is configured to receive a request from the node of the different one of the multiple computer networks, the request instructing the apparatus to obtain data.

In an embodiment, the received data comprises as a destination address an address of the node of the different one of the multiple computer networks, and the processor is configured to identify the node of the different one of the multiple computer networks based on the destination address.

In an embodiment, the processor is configured to identify the node of the different one of the multiple computer networks based on the content of the received data.

In an embodiment, the transceiver comprises a plurality of radio interfaces, each radio interface being configured to communicate according to a different radio standard, and the processor causes the transceiver to transmit the processed received data using a radio interface selected in dependence on the determined protocol suite.

In an embodiment, the selected radio interface is different from a radio interface used to receive the data.

In an embodiment, the apparatus is configured to communicate according to a plurality of different protocol suites and the processor is configured, with the transceiver, to join the apparatus to computer networks which are in range of the transceiver and which use one of the plurality of different protocol suites.

In an embodiment, the processor is configured, with the transceiver, to join the apparatus to computer networks which use a radio standard supported by the transceiver.

In an embodiment, the processor is configured to update the information stored on the memory with details of computer networks to which the apparatus is joined.

In an embodiment, the processor is configured, with the transceiver, to identify nodes of the multiple computer networks, and to update the information stored on the memory with details of the identified nodes.

In an embodiment, the processor is configured, with the transceiver, to notify a node of one of the multiple computer networks of nodes of a different one of the multiple computer networks.

In an embodiment, the processor is configured, with the transceiver, to transmit a beacon to a node of one of the multiple computer networks to notify that node of a node of a different one of the multiple computer networks.

In an embodiment, the processor is configured, with the transceiver, to determine a communication path between nodes of different computer networks, by relaying to the node of one computer network a route discovery message received from the node of another computer network, transmitting to the node of the other computer network a route reply message in the name of the node of the said one computer network, and updating information stored on the memory with the determined communication path.

In an embodiment, the memory is configured to store at least one of the following attributes for each of the multiple computer networks: an index number, a protocol suite, a personal area network (PAN) identifier (ID), a media access control (MAC) address of a PAN coordinator.

In an embodiment, the memory is configured to store at least one of the following attributes for each node of each of the multiple computer networks: a media access control (MAC) address, an originating network, a next-hop in originating network, an address in at least one non-originating network.

In an embodiment, at least one of the computer networks is a personal area network.

In an embodiment, at least one of the computer networks is wireless and the apparatus communicates wirelessly with the nodes of the at least one wireless computer network.

Various embodiments provide a method for interconnecting multiple computer networks, each computer network using a different protocol suite and comprising multiple nodes, the method comprising: joining each of the multiple computer networks to become a node of each of the multiple computer networks; receiving data from any node of any one of the multiple computer networks, the received data being for transmission to a node of a different one of the multiple computer networks; identifying the node of the different one of the multiple computer networks based on the received data; determining a protocol suite used by the different one of the multiple computer networks; processing the received data so that the received data appears to have been transmitted according to the determined protocol suite; and transmitting the processed received data to the node of the different one of the multiple computer networks.

In an embodiment, the method further comprises transmitting a request to the node of the said one of the multiple computer networks, the request instructing the node to transmit data.

In an embodiment, the method further comprises receiving a request from the node of the different one of the multiple computer networks, the request instructing that data be obtained.

In an embodiment, the received data comprises as a destination address an address of the node of the different one of the multiple computer networks, and identifying the node of the different one of the multiple computer networks is performed based on the destination address.

In an embodiment, identifying the node of the different one of the multiple computer networks is performed based on the content of the received data.

In an embodiment, transmitting the processed received data is performed using a radio interface selected in dependence on the determined protocol suite.

In an embodiment, receiving data is performed using a radio interface which is different from the selected radio interface.

In an embodiment, joining each of the multiple computer networks comprises joining computer networks which are in range and communicate according to one of a predetermined plurality of different protocol suites.

In an embodiment, joining each of the multiple computer networks comprises joining computer networks which use one of a predetermined plurality of radio standards.

In an embodiment, the method further comprises storing details of the computer networks which have been joined.

In an embodiment, the method further comprises identifying nodes of the multiple computer networks, and storing details of the identified nodes.

In an embodiment, the method further comprises notifying a node of one of the multiple computer networks of nodes of a different one of the multiple computer networks.

In an embodiment, notifying comprises transmitting a beacon to a node of one of the multiple computer networks to notify that node of a node of a different one of the multiple computer networks.

In an embodiment, the method further comprises determining a communication path between nodes of different computer networks, by relaying to the node of one computer network a route discovery message received from the node of another computer network, transmitting to the node of the other computer network a route reply message in the name of the node of the said one computer network, and storing details of the determined communication path.

In an embodiment, the method further comprises storing at least one of the following attributes for each of the multiple computer networks: an index number, a protocol suite, a personal area network (PAN) identifier (ID), a media access control (MAC) address of a PAN coordinator.

In an embodiment, the method further comprises storing at least one of the following attributes for each node of each of the multiple computer networks: a media access control (MAC) address, an originating network, a next-hop in originating network, an address in at least one non-originating network.

In an embodiment, at least one of the multiple computer networks is a personal area network.

In an embodiment, at least one of the multiple computer networks is wireless and communication with the nodes of the at least one wireless computer network is performed wirelessly.

Various embodiments provide a computer program product for interconnecting multiple computer networks, each computer network using a different protocol suite and comprising multiple nodes, the computer program product comprising at least one computer-readable storage medium having computer-executable program code instructions stored therein, the computer-executable program code instructions comprising: program code for joining each of the multiple computer networks to become a node of each of the multiple computer networks; program code for receiving data from any node of any one of the multiple computer networks, the received data being for transmission to a node of a different one of the multiple computer networks; program code for identifying the node of the different one of the multiple computer networks based on the received data; program code for determining a protocol suite used by the different one of the multiple computer networks; program code for processing the received data so that the received data appears to have been transmitted according to the determined protocol suite; and program code for transmitting the processed received data to the node of the different one of the multiple computer networks.

The further features described above with reference to the method are equally applicable, and hereby restated, in respect of the computer program product.

Figure 1:
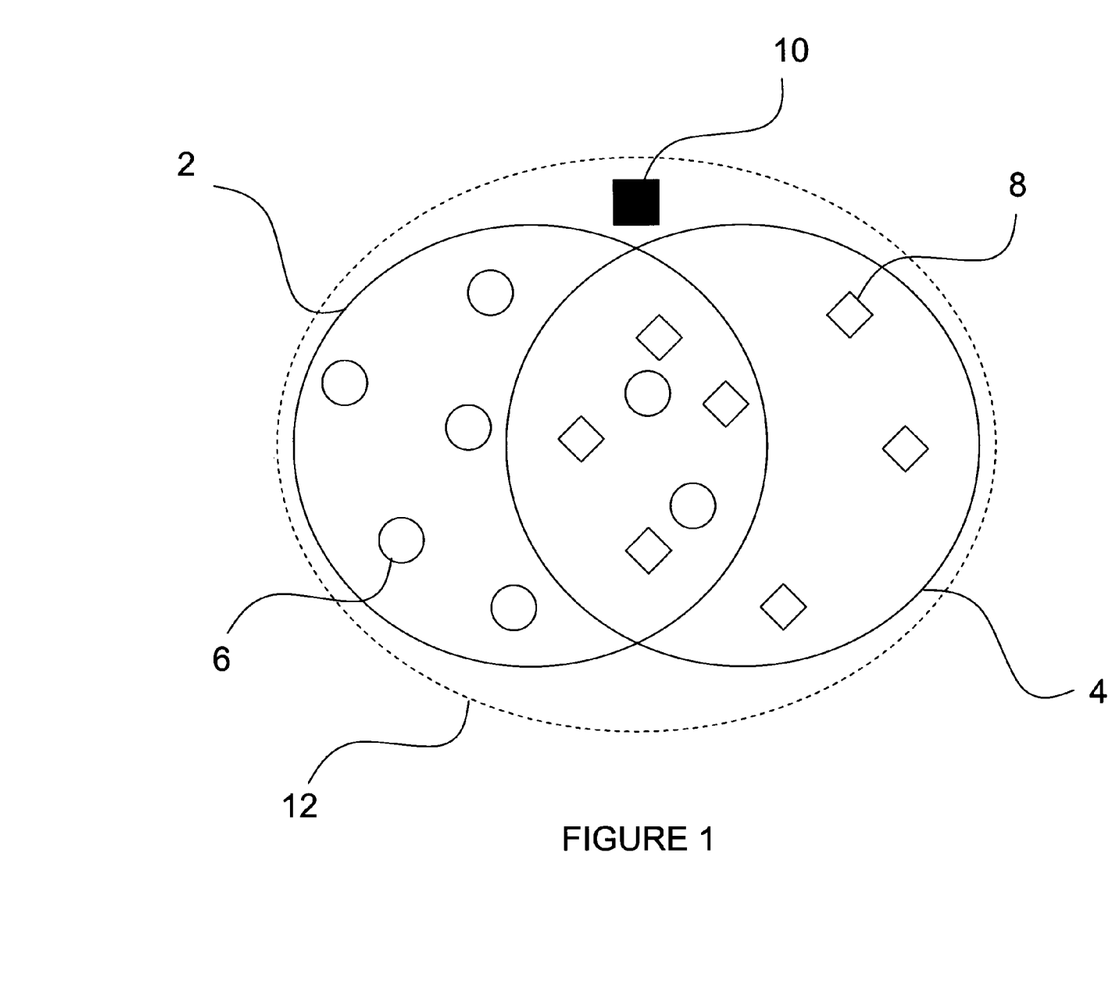
FIG. 1 illustrates an exemplary environment in which an embodiment operates.

FIG. 1 depicts an example environment within which an embodiment may operate. In FIG. 1, two computer networks are shown, a network 2 and a network 4. Both computer networks 2, 4, comprise one or more nodes. Specifically, network 2 comprises nodes 6 (indicated by a circle shape) whilst network 4 comprises nodes 8 (indicated by a diamond shape). In an embodiment, networks 2 and 4 are WPANs.

In an embodiment, a node is a connection point, either a redistribution point or a communication endpoint. In an embodiment, a node is an active electronic device that is part of its computer network, and is capable of sending, receiving, or forwarding information over a communications channel with other nodes of the computer network.

In an embodiment, each node is configured to communicate with the other nodes of its computer network using a particular protocol suite. In an embodiment, each node comprises a radio interface and is capable of communicating with the other nodes of its computer network via the radio interface. In an embodiment, the radio interface is configured to communicate data according to a particular radio standard (also known as a radio access technology). In an embodiment, the radio standard is a wireless radio standard. Two nodes which communicate with each other may communicate using the same protocol suite and the same radio standard.

As illustrated in the embodiment of FIG. 1, networks 2 and 4 are co-located in the same vicinity and within direct communication range of each other. In an embodiment, the protocol suite used by the nodes 6 of network 2 to communicate with each other is different to the protocol suite used by the nodes 8 of network 4 to communicate with each other. Therefore, the nodes 6 may not be able to communicate with the nodes 8.

Additionally, in an embodiment, the radio standard used by the nodes 6 of the network 2 to communicate with each other is different to the radio standard used by the nodes 8 of the network 4 to communicate with each other. Therefore, the nodes 6 may not be able to communicate with the nodes 8. It is to be understood that in some embodiments, the nodes 6 may use the same radio standard as the nodes 8; however, the nodes 6 may still be unable to communicate with the nodes 8 if they do not use the same protocol suite.

FIG. 1 also contains apparatus 10. In an embodiment, the apparatus 10 may be a gateway device. The apparatus 10 is configured in use to become a node of both network 2 and network 4 and to interconnect both networks. With the help of the apparatus 10, the network 2 and the network 4 merge together such that each node knows the existence of all other nodes, including both the nodes in its own network and the nodes in the other network. Accordingly, the apparatus 10 enables each node to communicate with all of the other nodes, just as if all nodes are within the same network. This operation is illustrated in FIG. 1 by interconnected region 12.

Figure 2:
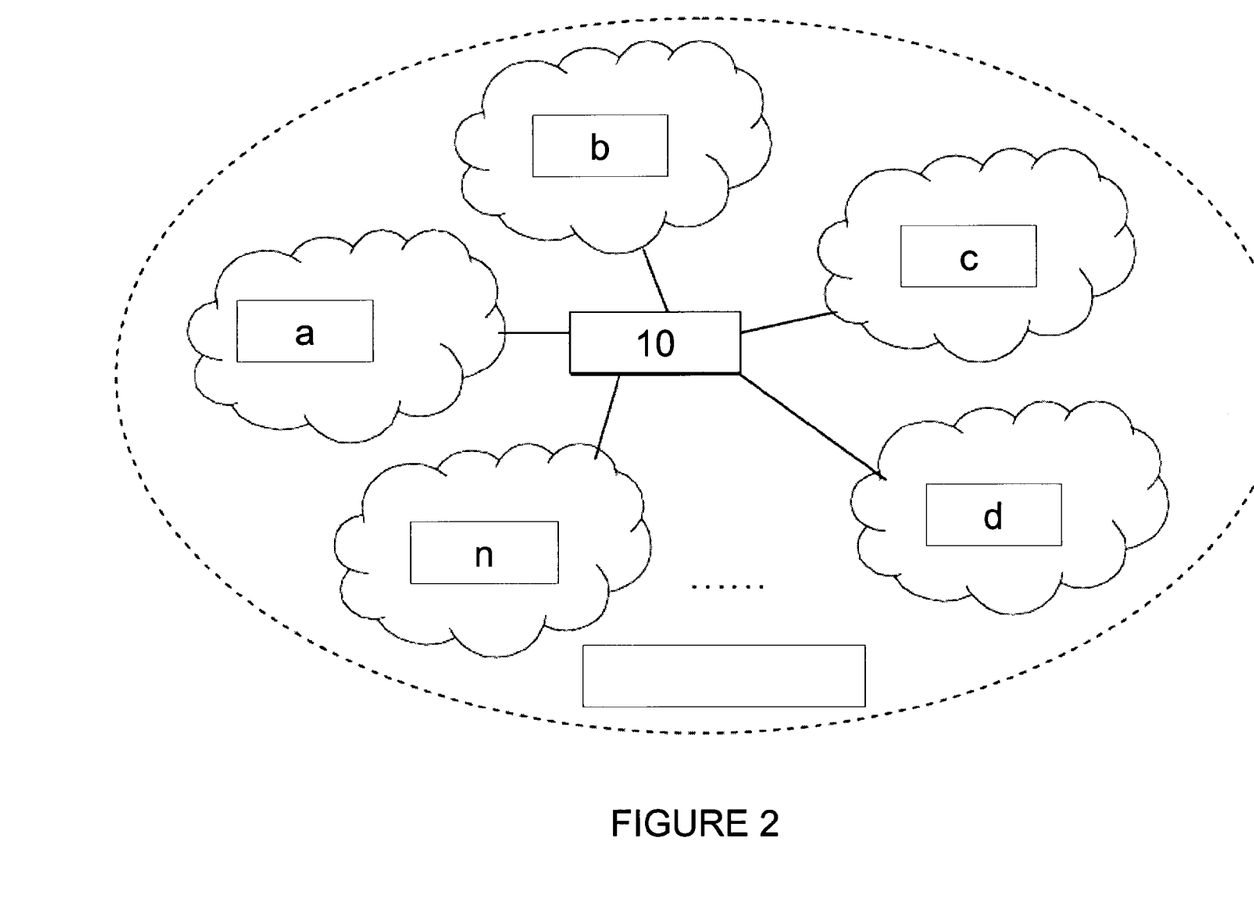
FIG. 2 illustrates a general application scenario of an embodiment.

FIG. 2 illustrates the interconnection of multiple computer networks by the apparatus 10. Specifically, the apparatus 10 joins each of networks 'a' to 'n' so as to become a node of each network. The apparatus 10 then passes data from the nodes of one network to the nodes of another network in order to interconnect the networks. In an embodiment, networks 'a' to 'n' are WPANs.

Figure 3:
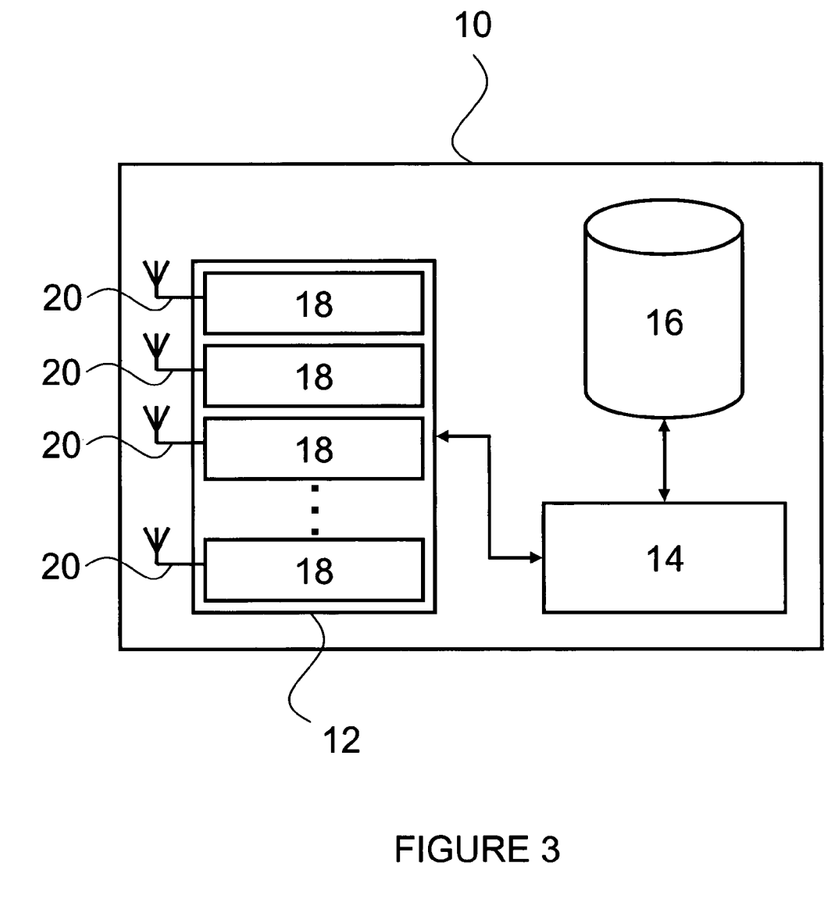
FIG. 3 illustrates an exemplary structure of an embodiment.

FIG. 3 illustrates the structure of an embodiment of the apparatus 10. Specifically, the apparatus 10 comprises a transceiver 12 in communication with a processor 14. The processor 14 is additionally in communication with a memory 16.

In an embodiment, the transceiver 12 comprises multiple radio interfaces 18. Each radio interface is configured in use to communicate data according to a particular radio standard (also known as a radio access technology). In an embodiment, the radio standard is a wireless radio standard. In an embodiment, each radio interface communicates using a specific modulation, channel and media access control settings. In an embodiment, each radio interface comprises an antenna 20 for use in transmitting and receiving data. However, in some embodiments, two or more radio interfaces may share an antenna.

In an embodiment, the memory 16 comprises information relating to the computer networks to which the apparatus 10 is joined (i.e. is a node of). In an embodiment, the information includes information relating to the computer networks themselves, such as, for example, in the form of a network list. In an embodiment, the information includes information relating to the individual nodes of the computer networks, such as, for example, in the form of a node list.

Figure 4:
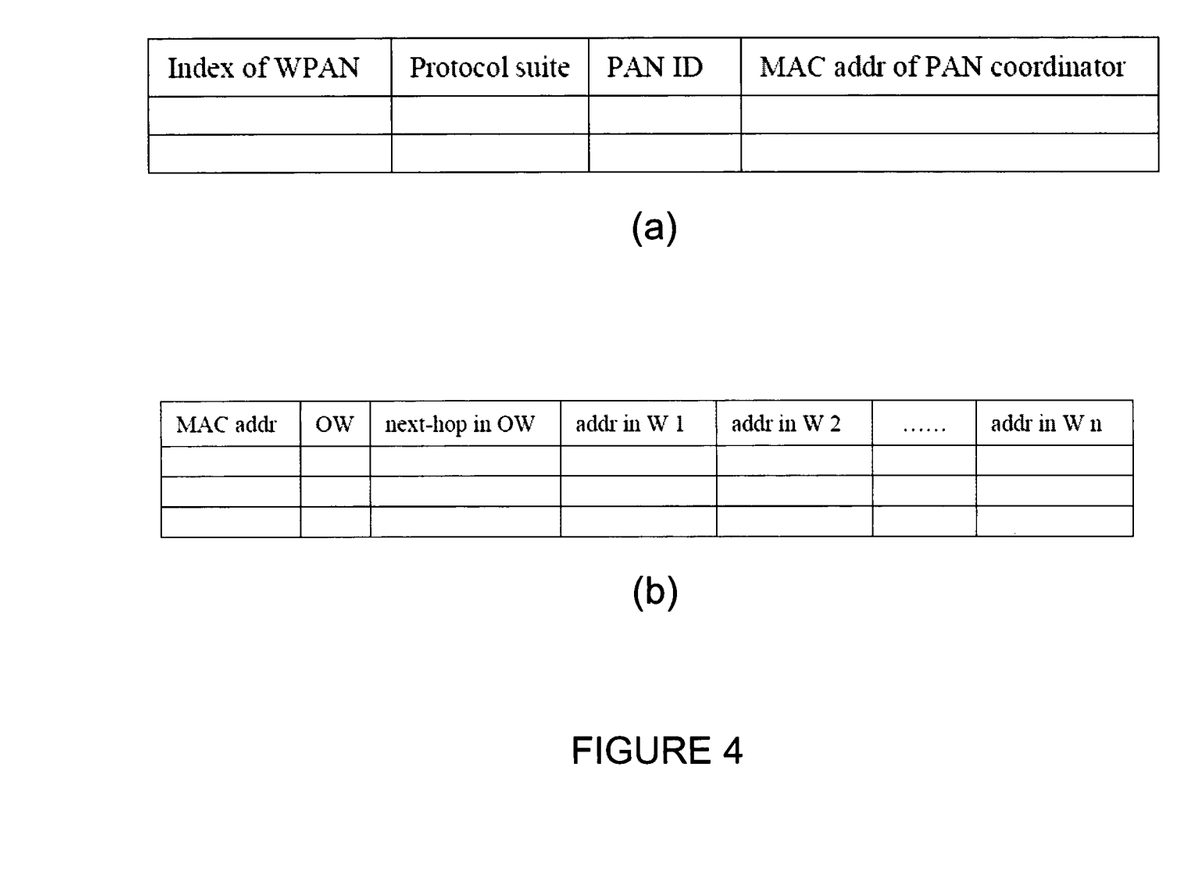
FIG. 4 illustrates exemplary stored contents of the memory of FIG. 3.

FIG. 4(*a*) illustrates an embodiment of an exemplary network list. As can be seen, for each network to which the apparatus 10 is joined, the network list may store the following values: an index of the network (e.g. WPAN), a protocol suite used by the network, a PAN ID of the network, and a media access control (MAC) address of a PAN coordinator of the network. The network index may allow efficient searching for a network within the network list; a PAN ID may uniquely identify communication packets between a PAN coordinator to the PAN members (i.e. other nodes); and a MAC address for a PAN coordinator may uniquely identify each PAN coordinator. In an embodiment, a PAN coordinator may be a node responsible for starting the formation of the PAN. The PAN coordinator may control the PAN and act as a coordinator or manager of the network. The PAN coordinator may also be responsible for choosing the PAN ID. There may be only one PAN coordinator in any PAN.

FIG. 4(*b*) illustrates an embodiment of an exemplary node list. As can be seen, for each node of each network to which the apparatus 10 is joined, the node list may store the following values: a MAC address of the node, an indication of which network the node belongs to (e.g. originating WPAN (OW)), a value for the next-hop in the originating network, and an address of the node in each network (e.g. W1, W2, . . . Wn) other than the originating network (OW). MAC addresses may identify nodes in each WPAN. Addresses of OW may identify the original network to which the node belongs to. The next-hop address may be necessary for routing purposes, and if the node has built associations with WPANs other than its OW. The identification of each of those WPANS may also be recorded.

It is to be understood that in some embodiments, the memory may store information in addition to, or instead of, some or all of the information depicted in FIG. 4. Furthermore, the type of information stored in respect of one network or node may be different to the type of information stored in respect of a different network or node.

In an embodiment, the processor 14 is configured in use to discover computer networks which are in range of the transceiver 12 and which use a protocol suite supported by the apparatus 10. In an embodiment, the memory stores information relating to a plurality of different protocol suites in order that the apparatus has the capability to communicate via each of the plurality of different protocol suites. However, in other some embodiments, the protocol suite information may be stored on an alternative memory (not shown). In an embodiment, the processor is configured in use to discover computer networks which use a radio standard that is supported by the transceiver 12.

In an embodiment, the processor 14 is configured in use to discover the nodes of each discovered computer network. Also, the processor 14 may be configured in use to advertise the presence of each discovered node to the discovered nodes of other computer networks. Additionally, the processor 14 may be configured in use to establish communication paths or routes between nodes of different computer networks which go via the apparatus 10. Furthermore, the processor 14 may be configured in use to manage the communication of data between nodes of different computer networks. Accordingly, the processor 14 may facilitate the interconnection of multiple computer networks.

Figure 5:
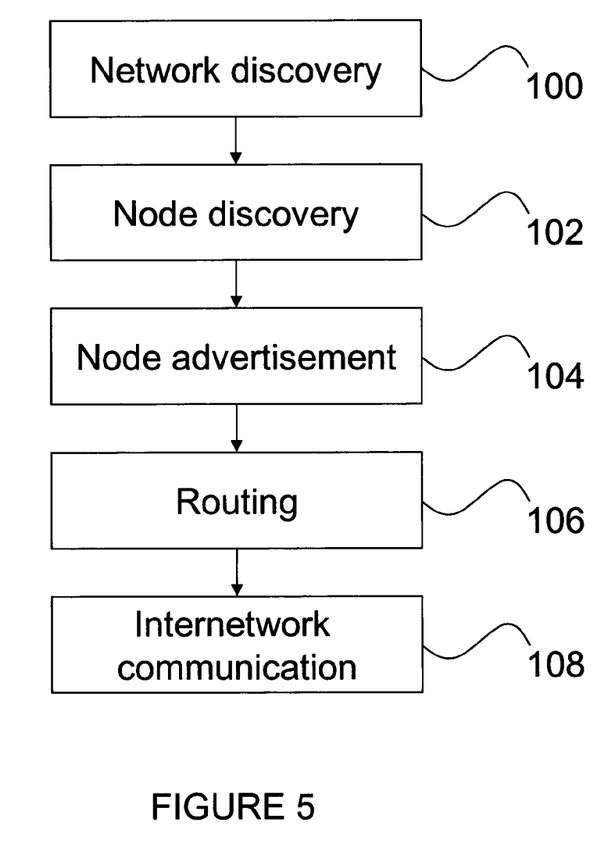
FIG. 5 illustrates a first exemplary operation of an embodiment.

FIG. 5 is a flow diagram illustrating the operation of the processor 14 in an embodiment. At 100, the processor 14 discovers all computer networks which are in range of the transceiver 12, and which use a protocol suite and radio standard supported by the apparatus 10. The processor 14 then joins each discovered computer network so that the apparatus 10 becomes a node of each discovered computer network. The processor 14 then updates the information stored on the memory 16 with details of each computer network joined. For example, the processor 14 may update a network list stored on the memory 16 to include details of each network joined, such as, for example, the details described above with reference to FIG. 4(*a*).

At 102, for each computer network joined in 100, the processor 14 discovers each node. In an embodiment, the processor 14 discovers an address of each node. In an embodiment, the address may include a unique MAC address of the node and/or a WPAN association related short address. The association address may be assigned when a node joins a WPAN. This address may identify whether a node is part of a WPAN such that it is allowed to communicate with other members of the WPAN. The processor 14 the updates the information stored on the memory 16 with details of each discovered node. For example, the processor 14 may update a node list stored on the memory 16 to include details of each discovered node, such as, for example, the details described above with reference to FIG. 4(*b*). In an embodiment, the apparatus also updates the memory 16 with details of itself as a node in each joined computer network.

At 104, for each node discovered in 102, the processor 14 advertises the existence of that node to the nodes of other computer networks. In other words, a node of one computer network is introduced to a node of a different computer network by the apparatus 10. In some embodiments, the processor 14 may advertise the existence of a node of one computer network to another node of the same computer network.

In an embodiment, the process of advertising may involve the following. For each node, the processor 14 may generate one or more beacons, wherein a beacon is a message for introducing one node to another node. Each beacon may contain information relating to both nodes, i.e. a first node being introduced to a second node. For example, the beacon may contain address information identifying each node. In an embodiment, the beacon may also contain other information relating to one or both of the nodes, such as, for example, some or all of the information contained in the node list of FIG. 4(*b*). In any case, once a beacon is generated, the processor 14 causes the transceiver 12 to transmit the beacon to the second node in order to introduce the first node to the second node. In some embodiments, each beacon may introduce more than one node to the node receiving the beacon.

In an embodiment, the process of advertising may involve initiating associations. Specifically, the processor 14 may generate association messages in the name of a node of one computer network for distribution to other computer networks. During the advertisement phase, beacons on behalf of the nodes in each network may be raised as join-requests for each participating WPAN. The beacon messages in this case may be identifiable to the target WPANs. If this is not the case, association request messages may be issued on behalf of the nodes. In this embodiment, the apparatus in this advertisement phase speaks on behalf of the nodes in the participating WPANs. According to the above operation, the processor 14 may be able to obtain a WPAN wide association address for each node in each other WPAN, i.e. obtain multiple addresses for each node wherein each address addresses the same node but from a different computer network. Accordingly, each node may be addressable from computer networks other than its own computer network. In an embodiment, the processor 14 may update the information stored on the memory 16 with details of each WPAN wide association address for each node. For example, the processor 14 may update a node list stored on the memory 16 to include each WPAN wide association address.

At 106, the processor 14 enables communication paths to be established between nodes of different computer networks. In other words, the processor facilitates discovery and maintenance of routes between such nodes. For example, the processor 14 may facilitate dynamic source routing. Specifically, if the processor 14 receives a route discovery message from a node of one computer network which is destined for delivery to a node of another computer network, the processor 14 may generate a route reply message in the name of the destination node, as if the destination node is one-hop away from the apparatus 10. The processor 14 may then use the transceiver 12 to transmit the route reply message to the source node, i.e. the node which sent the route discovery message. Additionally, the processor 14 may then resume route discovery to the destination node. Specifically, the processor 14 may generate a route discovery message and cause the transceiver 12 to transmit the route discovery message to the destination node inside the computer network of the destination node. In an embodiment, the processor 14 may update the information stored on the memory 16 with details of the 'next-hop' routing information. For example, the processor 14 may update a node list stored on the memory 16 to include such information.

Figure 6:
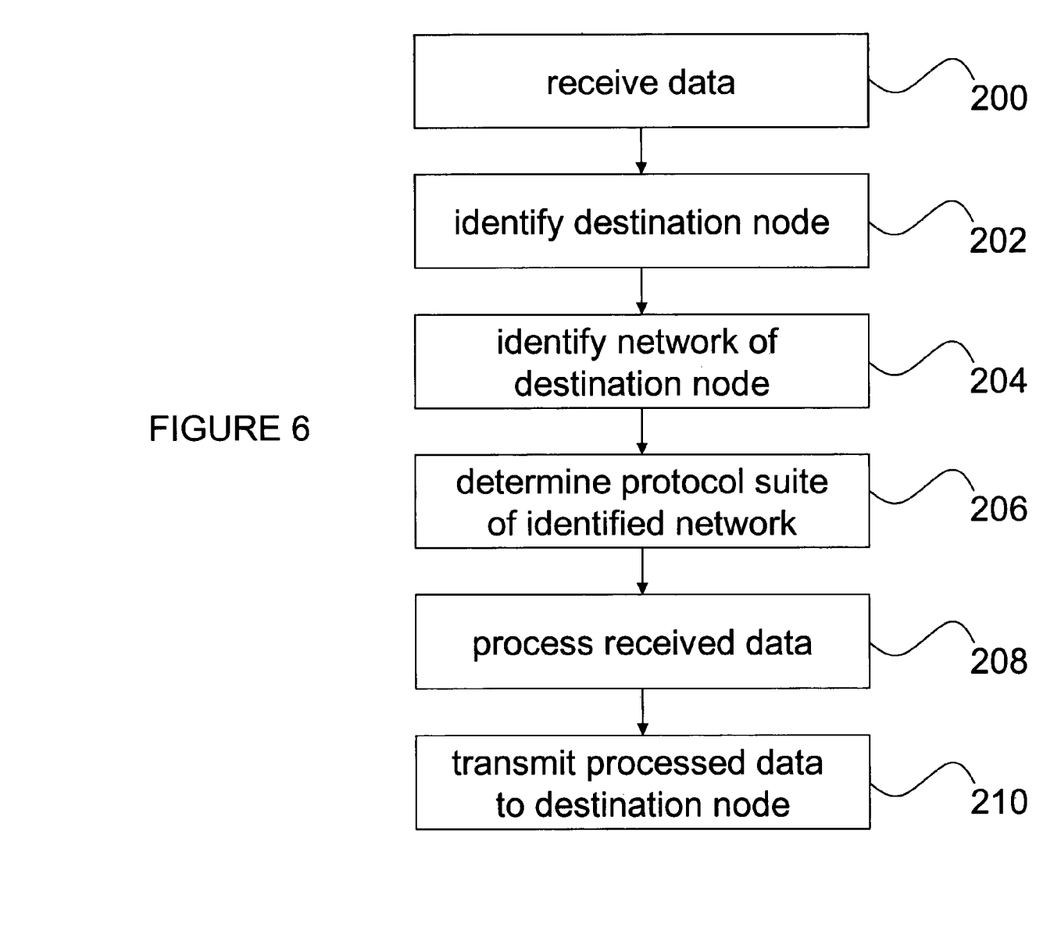
FIG. 6 illustrates a second exemplary operation of an embodiment.

At 108, the processor 14 facilitates communication of data between nodes of different computer networks. FIG. 6 provides a flow diagram of one embodiment of this operation. The following describes the embodiment of FIG. 6 in more detail.

At 200, the processor 14 receives data via the transceiver 12 from any node of any one of the computer networks to which the apparatus 10 is joined (hereinafter 'the computer networks'). The received data being for transmission to a node of a different one of the computer networks. The received data will have been generated according to the protocol suite and radio standard used by the computer network of the node from which it was transmitted, i.e. the source node. In an embodiment, the processor 14 identifies the protocol suite used in the received data. In an embodiment, the processor 14 identifies the radio standard used by the source node to transmit the received data.

In an embodiment, the transceiver 12 specifically receives the received data from the source node. In other words, the data is specifically transmitted from the source node to the apparatus 10. However, in some other embodiments, the data may not be specifically transmitted from the source node to the apparatus and, instead, the apparatus, via the transceiver and processor, may overhear the data transmitted from the source node. For example, such an arrangement may be used if single hop link local WPANs are supported by the apparatus.

At 202, the processor 14 identifies the node of the different one of the computer networks, i.e. the destination node. In an embodiment, the received data comprises a destination address and the processor 14 identifies the destination node from the destination address. For example, the processor 14 may compare the destination address with the information (e.g. a node list) stored in the memory 16 to identify which node has an address matching the destination address. It is noted that the processor 14 is capable of operating according to the protocol suite used by the source node's network and, therefore, the processor 14 is capable of reading information from the received data.

At 204, the processor 14 identifies the computer network to which the destination node belongs. For example, the processor 14 may identify the network using the information (e.g. a node list) stored in the memory 16. At 206, the processor 14 identifies the protocol suite used by the identified network. For example, the processor 14 may identify the network using the information (e.g. a network list) stored in the memory 16. In an embodiment, the processor 14 also identifies the radio standard used by the network containing the destination node.

At 208, the processor 14 processes the received data. In an embodiment, processing may involve translating the protocol suite from the protocol suite used by the source node to the protocol suite used by the destination node. Accordingly, the received data may be processed to appear as though it was transmitted according to the protocol suite used by the network of the destination node, rather than the protocol suite used by the network of the source node. In some other embodiments, processing may involve operations in addition to, or instead of, translation. For example, the processor may modify (e.g. add, remove or change) some or all of the data. Also, the processor may store some or all of the data, for example, on the memory 16.

At 210, the processor 14 causes the transceiver 12 to transmit the processed data to the destination node. Specifically, the processor 14 selects the radio interface 18 of the transceiver 12 which supports the radio standard used by the computer network of the destination node. In an embodiment, the processed data is transmitted with proper routing support such that the complete routing details are captured and dynamic source routing is not needed. However, if routing information cannot be retrieved from the information stored on the memory 16, dynamic source routing may be performed before transmitting the processed data. Accordingly, if the apparatus 10 is not aware of a communication path to the destination node, one can be established dynamically.

According to the above operation, data can be transmitted from any node of one computer network to any node of a different computer network in spite of the fact that the different computer networks use different protocol suites and, possibly, different radio standards. Stated differently, the above operation does more than just provide interoperability between two isolated nodes of two different computer networks. On the contrary, it facilitates interoperability between any two nodes of different networks. Accordingly, if common applications are supported by two nodes, the nodes can be interconnected with each other even if they use different protocols or radio standards.

In an embodiment, the apparatus communicates directly with a node of a computer network to which it is joined. In some other embodiments, the apparatus communicates either directly with the node or, alternatively, indirectly and via other nodes of the other computer network. In other words, the apparatus may also communicate with nodes via other computer networks, such as, for example, the internet, if the apparatus has the sufficient radio and protocol capability to interface with the other networks, such as the internet. Accordingly, nodes are connected and are better able to exploit and share knowledge locally among the vicinity such that location based services (LBS), which are a crucial part of Ambient Intelligence technologies, can be greatly facilitated. Examples of LBS include location-based commercial advertisements, location-based service delivery and location-based activity sensing in smart homes. Also, according to some embodiments, local cooperation can be supported across different (device level) radio technologies and (system level) computer network deployments. Further, some embodiments provide a convenient way for instant data sharing among proximate devices without the support of other infrastructure based systems, such as the internet.

In some other embodiments, the operation of the processor 14 in facilitating internetwork communication may vary from the above. In some other embodiments, the processor 14 may identify the destination node by other means, rather than via an address contained in the received data. For example, the processor 14 may identify the destination node based on a different attribute of the received data, such as, for example, the contents of the received data. In some other embodiments, the processor 14 may determine the destination node based on the source node. For example, the memory 16 may comprise information which defines relationships between particular nodes such that data received from one specific node is automatically transmitted to one or more other specific nodes.

In some other embodiments, the processor 14 maybe configured to cause the transceiver to transmit a request to a node, the request requesting that the node transmit data to the apparatus. For example, prior to the apparatus 10 receiving (or overhearing) data from the source node, the apparatus 10 may transmit a request to the source node. Accordingly, the data received from the source node may have been transmitted in response to a request transmitted by the apparatus to the source node. In this way, the apparatus may query the source node to request data therefrom. In an embodiment, the request may contain details of the data which the apparatus wants to receive from the source node. In some other embodiments, the request may not contain any such details and, for example, the source node may send custom data in dependence on the apparatus which sent the request, or may just send default data.

In some other embodiments, the processor 14, via the transceiver 12, is configured to receive a request from a node, the request requesting that the apparatus obtain data for the node. For example, prior to the apparatus sending a request to the source node, the apparatus may receive a request from the destination node. In an embodiment, the request from the destination node may contain details regarding what data to collect. In an embodiment, the request from the destination node may contain details regarding from which node(s) to collect data. In an embodiment, the apparatus itself may store data, for example, on the memory 16, and the requested data may be stored on the memory 16. Accordingly, the apparatus may be able to send the requested data to the destination node without first obtaining it from the source node.

In an embodiment, when the apparatus receives a request for data from a destination node, the apparatus may itself identify a source node for that data. This may be case regardless of whether the received request identifies a source node for that data. In an embodiment, where the apparatus transmits a request to a source node in response to receiving a request from a destination node, the apparatus may just forward the received request to the source node, rather than generate a new request. However, in some embodiments, the apparatus may itself generate a new request for transmission to the source node.

In an embodiment, the multiple computer networks may each contain as nodes sensors and, possibly, meters. For example, a sensor may be a type of electrical sensor, such as, for example, a voltage sensor or a current sensor. Additionally, a meter may be an electrical meter which is capable of measuring a total voltage drop or current flow relating to all sensors connected to it. In an embodiment relating to electricity usage in an area (e.g. a building, a city, a region), a meter may be positioned to measure the total electricity usage (e.g. kWh) in the area. Additionally, each electric appliance within the area may comprise an electrical sensor to detect the electricity usage for that appliance. Accordingly, assuming that the sensors and the meter operate according to the same protocol suite and radio standard, each sensor may transmit to the meter the individual electricity usage of its corresponding electrical appliance. Therefore, the meter may determine the proportion of the total electricity being used by each individual appliance. Such information may be obtained by electricity companies and, for example, be used to set electricity prices.

However, due to some electric appliances being manufactured by different companies, the electrical sensors of one appliance may operate using a different protocol suite and, possibly, a different radio standard, to the electrical sensors of other appliances. Therefore, some sensors may be incapable of communicating with the meter. In an embodiment, the apparatus 10 may interconnect multiple networks of sensors and meters which use different protocol suites and, possibly, different radio standards. In this way, an electrical appliance using one protocol suite and radio standard may provide electrical usage information to a meter using a different protocol and, possibly, a different radio standard.

In the above-described embodiments, the computer networks interconnected by the apparatus are co-located, co-existing networks which are in direct communication range with each other. In other words, the networks are all in the same vicinity or in overlapping vicinities. However, it is to be understood that in some embodiments, one or more networks may not be in the vicinity of the other networks. In an embodiment, none of the networks may be in the same or similar vicinities.

In such embodiments, the apparatus may comprise a distributed structure having two or more parts. In operation, each part may be interconnected together. For example, each part may be interconnected by a designated wired or wireless connection path. Alternatively, each part may be interconnected via another computer network, such as, for example, the internet. In any case, the operation of the distributed apparatus would be analogous to the above-described operation, the only difference being that the networks joined by the apparatus maybe in different locations, such as; for example, different buildings, cities or countries.

In an embodiment, the distributed structure may include a central processing part and one or more interface parts. The central processing part may comprise the processor and memory, whereas each interface part may comprise one or more radio interfaces. According to this structure, each interface part may be co-located with a computer network and each network may be located out of range of the other computer networks. The central processing part may be co-located with one of the interface parts or may be located elsewhere. In order to operate as described above, each part may be connected together.

In the above-described embodiments, the apparatus is configured to process received data by translating the protocol syntax from a protocol suite used by the network of the source node to a protocol suite used by the network of the destination node. However, in some embodiments, the processor may be configured to perform an initial check to determine whether or not the protocol suite relating to the source node is the same or different to the protocol suite relating to the destination node. In such embodiments, the processor may only perform a translation operation in cases where the two protocol suites do not match.

In an embodiment, a node may either be a data circuit-terminating equipment (DCE) such as a modem, hub, bridge or switch; or a data terminal equipment (DTE) such as a digital telephone handset, a printer or a host computer, for example a router, a workstation or a server. In an embodiment, every node may have a MAC address, typically one for each network interface controller it possesses. Examples are computers, packet switches, xDSL modems (with Ethernet interface) and wireless LAN access points.

In an embodiment, the apparatus may comprise radio interfaces configured to operate according to any of the following radio standards: IEEE 802.15.4, 6LoWPAN, Bluetooth, UWB. In an embodiment, the apparatus may be capable of operating using the following wireless network technologies: IrDA, Bluetooth, Wireless USB, Z-Wave and ZigBee. In an embodiment, the apparatus may be capable of operating using the following protocol suites: Bluetooth, UWB, Zigbee, 6LoWPAN, WirelessHART and other IEEE 802.15.4 based WPANs. In an embodiment, the apparatus may be capable of operating using any communication protocol at a specific layer (e.g. IEEE 802.15.4, 6LoWPAN) or a complete stack (e.g. Bluetooth, ZigBee).

In an embodiment, a computer network is a PAN. In an embodiment, a computer network is a wireless computer network, such as, for example, a WPAN.

Unlike the internet, the ultimate design goal of which is to enable ubiquitous interconnections among computer networks, most WPANs are designed and optimized for special short range tasks. For example, Bluetooth is designed for short range data exchange between embedded devices while Zigbee is designed for wireless monitoring, automation, and control. As each of these WPANs handles a different application task and they usually work in an isolated manner. Connecting everything to the internet is a simple way to address interconnection issues. As long as all the WPANs are connected to the internet, they can communicate with each other. However, as the internet does not manage locality information of each WPANs, even if co-existing WPANs can communicate with each other through the internet, it is very difficult for them to discover their co-location status and cooperate on location-based issues.

As mentioned above, according to some embodiments, local interconnectivity among co-existing WPANs not only provides connectivity but also helps to better exploit and share knowledge locally among the vicinity such that Location Based Services (LBS), which are a crucial part of Ambient Intelligence technologies, could be greatly facilitated. According to some embodiments, local cooperation can be supported across different (device level) radio technologies and (system level) WPAN deployments. Some embodiments also provide a convenient way for instant data sharing among proximate devices without the support of other infrastructure based systems, such as the internet.

With the current trend of connecting WPANs to the Internet, there are many corresponding efforts to decouple the applications of existing WPANs from their under-layer protocols and transplant them onto the internet protocol suites, such as the adaptation of ZigBee Application Layer (ZAL) over UDP. According to some embodiments, these decoupled applications can be directly adopted by embedded devices, despite their under-layer protocols. Designs of new applications of embedded devices can also be totally protocol transparent.

It is an advantage of some embodiments that embedded devices can be pervasively interconnected with nearby devices. The connectivity degree of each device is thus greatly enlarged. Given a more cooperative application, such enlarged connectivity degree implies a larger information base and more versatile functionalities that can be utilized by each embedded device.

It is an advantage of some embodiments that the interconnection of multiple networks which use different protocol suites and, possibly, different radio standards may be applied to a broad spectrum of applications, such as, for example, environmental monitoring, homeland security, battlefield operations, disaster warning and rescue, industrial automation, healthcare monitoring, transportation, smart buildings, smart grids, etc. Also, some embodiments may enable interoperability between commercial wireless networking products of various vendors. Additionally, some embodiments may enable many application scenarios that cannot currently be realized due to technological limitations. Important application domains such as smart grids will greatly benefit from some embodiments since they enable wireless networking products from various vendors to interoperate for grid-wide communication.

The above describes embodiments in the form of apparatuses and methods. It is to be understood that these embodiments may be implemented in the form of software running on a computer. In some embodiments, the methods may be implemented as a combination or hardware and software. In an embodiment, a computer program product is provided, the computer program product comprising at least one computer-readable storage medium having computer-executable program code instructions stored therein, the computer-executable program code instructions comprising program code for implementing the above-described methods.

While the invention has been particularly shown and described with reference to specific example embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An apparatus for interconnecting multiple computer networks, each computer network using a different protocol suite and comprising multiple nodes, the apparatus being a node of each computer network, the apparatus comprising:
   a transceiver configured to receive data from any node of any one of the multiple computer networks, the received data being for transmission to a node of a different one of the multiple computer networks;
   a memory configured to store information relating to the multiple computer networks; and
   a processor configured, with the transceiver, to join the apparatus to computer networks which are in range of the transceiver and which use one of a plurality of different protocol suites, wherein the apparatus is configured to communicate according to the plurality of different protocol suites;
   wherein the processor is configured, with the transceiver, to discover nodes of the multiple computer networks and to update the information stored on the memory with details of the discovered nodes;

wherein the details of the discovered nodes comprises information on protocol suites of the computer networks of the discovered nodes;

wherein the processor is further configured to identify the node of the different one of the multiple computer networks based on the received data, to determine the protocol suite of the different one of the multiple computer networks based on the updated information on the memory, to process the received data so that the received data appears to have been transmitted according to the determined protocol suite, and to cause the transceiver to transmit the processed received data to the node of the different one of the multiple computer networks.

2. The apparatus of claim 1, wherein the processor is configured, with the transceiver, to transmit a request to the node of the one of the multiple computer networks, the request instructing the node to transmit data to the apparatus.

3. The apparatus of claim 2, wherein the transceiver is configured to receive a request from the node of the different one of the multiple computer networks, the request instructing the apparatus to obtain data.

4. The apparatus of claim 1, wherein the received data comprises as a destination address an address of the node of the different one of the multiple computer networks, and the processor is configured to identify the node of the different one of the multiple computer networks based on the destination address.

5. The apparatus of claim 1, wherein the processor is configured to identify the node of the different one of the multiple computer networks based on the content of the received data.

6. The apparatus of claim 1, wherein the transceiver comprises a plurality of radio interfaces, each radio interface being configured to communicate according to a different radio standard, and the processor causes the transceiver to transmit the processed received data using a radio interface selected in dependence on the determined protocol suite.

7. The apparatus of claim 6, wherein the selected radio interface is different from a radio interface used to receive the data.

8. The apparatus of claim 1, wherein the processor is configured, with the transceiver, to join the apparatus to computer networks which use a radio standard supported by the transceiver.

9. The apparatus of claim 1, wherein the processor is configured to update the information stored on the memory with details of computer networks to which the apparatus is joined.

10. The apparatus of claim 1, wherein the processor is configured, with the transceiver, to notify a node of one of the multiple computer networks of nodes of a different one of the multiple computer networks.

11. The apparatus of claim 10, wherein the processor is configured, with the transceiver, to transmit a beacon to a node of one of the multiple computer networks to notify that node of a node of a different one of the multiple computer networks.

12. The apparatus of claim 1, wherein the processor is configured, with the transceiver, to determine a communication path between nodes of different computer networks, by relaying to the node of one computer network a route discovery message received from the node of another computer network, transmitting to the node of the other computer network a route reply message in a name of the node of the said one computer network, and updating information stored on the memory with the determined communication path.

13. The apparatus of claim 1, wherein the memory is configured to store at least one of the following attributes for each of the multiple computer networks: an index number, a protocol suite, a personal area network (PAN) identifier (ID), a media access control (MAC) address of a PAN coordinator.

14. The apparatus of claim 1, wherein the memory is configured to store at least one of the following attributes for each node of each of the multiple computer networks: a media access control (MAC) address, an originating network, a next-hop in originating network, an address in at least one non-originating network.

15. The apparatus of claim 1, wherein at least one of the computer networks is wireless and the apparatus communicates wirelessly with the nodes of the at least one wireless computer network.

16. A method for interconnecting multiple computer networks, each computer network using a different protocol suite and comprising multiple nodes, the method comprising:
 a. joining each of the multiple computer networks to become a node of each of the multiple computer networks, wherein joining each of the multiple computer networks comprises joining computer networks which are in range and communicate according to one of a predetermined plurality of different protocol suites;

discovering nodes of the multiple computer networks, and storing details of the identified nodes, wherein the details of the discovered nodes comprises information on protocol suites of the computer networks of the discovered nodes;

receiving data from any node of any one of the multiple computer networks, the received data being for transmission to a node of a different one of the multiple computer networks;

identifying the node of the different one of the multiple computer networks based on the received data;

determining the protocol suite used by the different one of the multiple computer networks based on the stored details;

processing the received data so that the received data appears to have been transmitted according to the determined protocol suite; and transmitting the processed received data to the node of the different one of the multiple computer networks.

17. The method of claim 16, further comprising transmitting a request to the node of the said one of the multiple computer networks, the request instructing the node to transmit data.

18. The method of claim 17, further comprising receiving a request from the node of the different one of the multiple computer networks, the request instructing that data be obtained.

19. The method of claim 16, wherein the received data comprises as a destination address an address of the node of the different one of the multiple computer networks, and identifying the node of the different one of the multiple computer networks is performed based on the destination address.

20. The method of claim 16, wherein identifying the node of the different one of the multiple computer networks is performed based on the content of the received data.

21. The method of claim 16, wherein transmitting the processed received data is performed using a radio interface selected in dependence on the determined protocol suite.

22. The method of claim 21, wherein receiving data is performed using a radio interface which is different from the selected radio interface.

23. The method of claim 16, wherein joining each of the multiple computer networks comprises joining computer networks which use one of a predetermined plurality of radio standards.

24. The method of claim 16, further comprising storing details of the computer networks which have been joined.

25. The method of claim 16, further comprising notifying a node of one of the multiple computer networks of nodes of a different one of the multiple computer networks.

26. The method of claim 25, wherein notifying comprises transmitting a beacon to a node of one of the multiple computer networks to notify that node of a node of a different one of the multiple computer networks.

27. The method of claim 16, further comprising determining a communication path between nodes of different computer networks, by relaying to the node of one computer network a route discovery message received from the node of another computer network, transmitting to the node of the other computer network a route reply message in a name of the node of the said one computer network, and storing details of the determined communication path.

28. The method of claim 16, further comprising storing at least one of the following attributes for each of the multiple computer networks: an index number, a protocol suite, a personal area network (PAN) identifier (ID), a media access control (MAC) address of a PAN coordinator.

29. The method of claim 16, further comprising storing at least one of the following attributes for each node of each of the multiple computer networks: a media access control (MAC) address, an originating network, a next-hop in originating network, an address in at least one non-originating network.

30. The method of claim 16, wherein at least one of the multiple computer networks is wireless and communication with the nodes of the at least one wireless computer network is performed wirelessly.

31. A computer program product for interconnecting multiple computer networks, each computer network using a different protocol suite and comprising multiple nodes, the computer program product comprising at least one non-transitory computer-readable storage medium storing computer-executable program code instructions that, when loaded into one or more processors, cause the one or more processors to implement a method comprising:

joining each of the multiple computer networks to become a node of each of the multiple computer networks, wherein joining each of the multiple computer networks comprises joining computer networks which are in range and communicate according to one of a predetermined plurality of different protocol suites;

discovering nodes of the multiple computer networks, and storing details of the identified nodes, wherein the details of the discovered nodes comprises information on protocol suites of the computer networks of the discovered nodes;

receiving data from any node of any one of the multiple computer networks, the received data being for transmission to a node of a different one of the multiple computer networks;

identifying the node of the different one of the multiple computer networks based on the received data;

determining the protocol suite used by the different one of the multiple computer networks based on the stored details;

processing the received data so that the received data appears to have been transmitted according to the determined protocol suite; and transmitting the processed received data to the node of the different one of the multiple computer networks.

* * * * *